US012640818B2

(12) United States Patent
Pang et al.

(10) Patent No.: US 12,640,818 B2
(45) Date of Patent: May 26, 2026

(54) OPTICAL SIGNAL DETECTORS COMPRISING OPTICAL SIGNAL SENSORS AND LOGARITHMIC AMPLIFIERS, SYSTEMS COMPRISING THE SAME, AND METHODS OF USE THEREFOR

(71) Applicant: General Dynamics Mission Systems, Inc., Fairfax, VA (US)

(72) Inventors: Michael Pang, Columbia, MD (US); Juan C Juarez, Ellicott City, MD (US); Jean Kalkavage, Columbia, MD (US); Jack Tallent, Ellicott City, MD (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 240 days.

(21) Appl. No.: 18/512,278

(22) Filed: Nov. 17, 2023

(65) Prior Publication Data

US 2025/0167895 A1 May 22, 2025

(51) Int. Cl.
*H04B 10/69* (2013.01)

(52) U.S. Cl.
CPC ....... *H04B 10/6911* (2013.01); *H04B 10/697* (2013.01)

(58) Field of Classification Search
CPC .......................... H04B 10/6911; H04B 10/697
USPC ........................................................ 398/202
See application file for complete search history.

(56) References Cited

U.S. PATENT DOCUMENTS

| | | | | |
|---|---|---|---|---|
| 4,131,254 A | * | 12/1978 | Underwood | ............ F41G 7/226 |
| | | | | 244/3.16 |
| 6,822,433 B1 | * | 11/2004 | Gilbert | ................... H03G 7/001 |
| | | | | 324/76.77 |
| 7,092,644 B2 | * | 8/2006 | Davidson | ........... H04B 10/6933 |
| | | | | 398/213 |
| 8,558,152 B2 | * | 10/2013 | Roncone | ................. F41G 7/226 |
| | | | | 250/206 |
| 11,329,728 B1 | * | 5/2022 | Adams | ................. H04B 10/532 |
| 11,579,014 B1 | * | 2/2023 | Zhang | .................. H04B 10/118 |

(Continued)

FOREIGN PATENT DOCUMENTS

| | | | | | |
|---|---|---|---|---|---|
| CN | 101325264 B | * | 5/2016 | ............. | H01M 8/04 |
| CN | 110086535 A | * | 8/2019 | ............. | H04B 10/11 |

OTHER PUBLICATIONS

Taos ;programmable color light-to—frequency converter; Jul. 2009; Texas Advanced optoelectronic Instruments, pp. 1-14. (Year: 2009).*

*Primary Examiner* — Amritbir K Sandhu
(74) *Attorney, Agent, or Firm* — Ingrassia Fisher & Lorenz, LLP

(57) ABSTRACT

Optical signal detectors, systems including the detectors, and methods of using the detectors and systems are provided. The optical signal detector may include an aperture for receiving an optical signal, an optical signal sensor having separate photodiodes each configured to be irradiated with portions of the optical signal directed from the aperture, detect the portions of the optical signal impinging therewith, and generate analog signals therefrom, logarithmic amplifiers each configured to receive the analog signals from a corresponding one of the photodiodes of the optical signal sensor, perform logarithmic amplification of the received analog signals, and generate logarithmic analog signals from the analog signals.

20 Claims, 9 Drawing Sheets

(56) References Cited

U.S. PATENT DOCUMENTS

2017/0126190 A1* 5/2017 Nakhkoob ............... H03G 5/28
2018/0233819 A1* 8/2018 Royalty ................... H01Q 3/32

* cited by examiner

Figure 9:
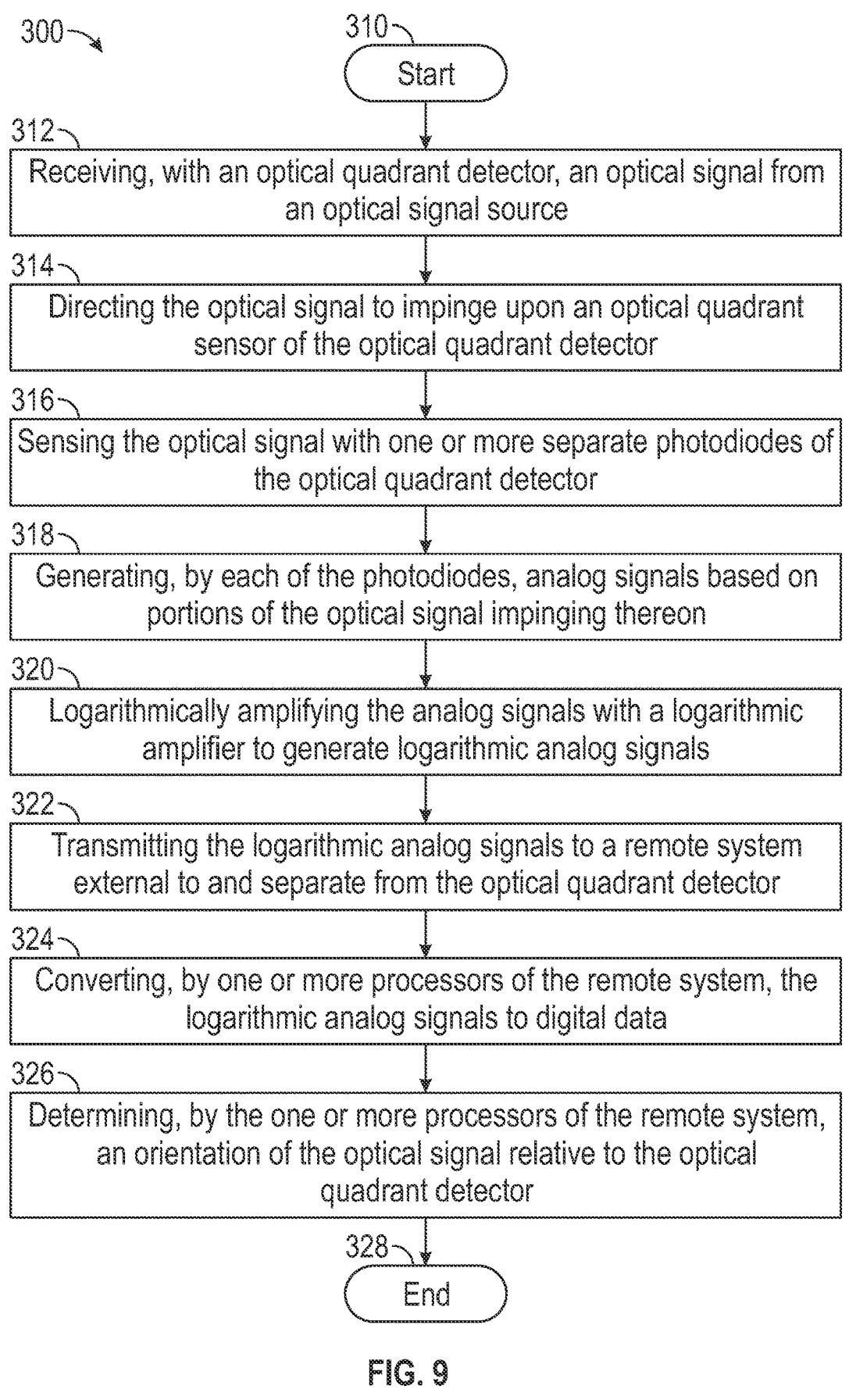

310 — Start

312 — Receiving, with an optical quadrant detector, an optical signal from an optical signal source 314 — Directing the optical signal to impinge upon an optical quadrant sensor of the optical quadrant detector 316 — Sensing the optical signal with one or more separate photodiodes of the optical quadrant detector 318 — Generating, by each of the photodiodes, analog signals based on portions of the optical signal impinging thereon 320 — Logarithmically amplifying the analog signals with a logarithmic amplifier to generate logarithmic analog signals 322 — Transmitting the logarithmic analog signals to a remote system external to and separate from the optical quadrant detector 324 — Converting, by one or more processors of the remote system, the logarithmic analog signals to digital data 326 — Determining, by the one or more processors of the remote system, an orientation of the optical signal relative to the optical quadrant detector 328 — End

OPTICAL SIGNAL DETECTORS COMPRISING OPTICAL SIGNAL SENSORS AND LOGARITHMIC AMPLIFIERS, SYSTEMS COMPRISING THE SAME, AND METHODS OF USE THEREFOR

TECHNICAL FIELD OF THE INVENTION

The present invention generally relates to position measurement of an optical signal, and more particularly relates to systems and methods that use a combination of an optical signal sensor and logarithmic amplifiers to produce logarithmic analog signals from optical signals for processing and position measurement.

BACKGROUND OF THE INVENTION

Optical quadrant detectors are devices used to measure positions and intensities of optical signals. Typically, the detectors include sensors comprising four separate photodiodes arranged in a square or rectangular configuration. Each of the photodiodes are responsible for detecting portions of the optical signal in their respective quadrant of the detector. When the optical signal impinges on the photodiodes, output signals from the individual photodiodes provide information about the orientation of the optical signal and/or a position of a source thereof relative to a center of the sensor. By comparing the output signals, one can determine the position of the optical signal relative to the center of the sensor.

Optical quadrant detectors may be used in various applications to provide real-time feedback about the direction in which an incident light is moving and can be used to adjust the position of a light source or target accordingly. Examples of applications of optical quadrant detectors include laser beam alignment, optical tracking systems, and industrial automation. Various existing optical quadrant detectors commonly function based on analog signal processing and linear amplification. That is, the photodiodes each produce a photo current (Ix) in response to irradiation by the optical signal, and then the optical quadrant detector combines the photo currents to produce position (e.g., x position and y position) and sum signals for position determination. These optical quadrant detectors are typically used for relatively slow applications.

Accordingly, there is there is an ongoing desire for improved optical signal detectors, especially those capable of operating in high-speed applications such as those that operate in the presence of atmospheric turbulence. Furthermore, other desirable features and characteristics of the present invention will become apparent from the subsequent detailed description and the appended claims, taken in conjunction with the accompanying drawings and the foregoing technical field and background.

SUMMARY OF THE INVENTION

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, an optical signal detector is provided that includes an aperture for receiving an optical signal, an optical signal sensor having separate photodiodes each configured to be irradiated with portions of the optical signal directed from the aperture, detect the portions of the optical signal impinging therewith, and generate analog signals therefrom, logarithmic amplifiers each configured to receive the analog signals from a corresponding one of the photodiodes of the optical signal sensor, perform logarithmic amplification of the received analog signals, and generate logarithmic analog signals from the analog signals.

In various embodiments, a system is provided that includes an optical signal detector including an aperture for receiving an optical signal, an optical signal sensor having separate photodiodes each configured to be irradiated with portions of the optical signal directed from the aperture, detect the portions of the optical signal impinging therewith, and generate analog signals therefrom, logarithmic amplifiers each configured to receive the analog signals from a corresponding one of the photodiodes of the optical signal sensor, perform logarithmic amplification of the received analog signals, and generate logarithmic analog signals from the analog signals, and a controller configured to, by one or more processors, convert the logarithmic analog signals to digital data and determine an orientation of the optical signal relative to the optical signal detector.

In various embodiments, a method is provided that includes receiving, with an optical signal detector, an optical signal from an optical signal source, directing the optical signal to impinge upon photodiodes of an optical signal sensor of the optical signal detector, sensing the optical signal with the photodiodes of the optical signal sensor, generating, by each of the photodiodes, analog signals based on portions of the optical signal impinging thereon, logarithmically amplifying the analog signals with logarithmic amplifiers to generate logarithmic analog signals, converting, by one or more processors, the logarithmic analog signals to digital data, and determining, by the one or more processors, an orientation of the optical signal relative to the optical signal detector.

Furthermore, other desirable features and characteristics of the system and methods will become apparent from the subsequent detailed description and the appended claims, taken in conjunction with the accompanying drawings and the preceding background.

BRIEF DESCRIPTION OF DRAWINGS

The present invention will hereinafter be described in conjunction with the following drawing figures, wherein like numerals denote like elements, and wherein:

FIG. 5 is a rear perspective view of the optical signal detector of FIGS. 1-4 with a cover and various internal components thereof removed to reveal a compartment of the optical signal detector in accordance with various examples;

FIG. 9 is flowchart of a method for position measurement of an optical signal as performed by the system of FIG. 8 in accordance with various examples.

DETAILED DESCRIPTION

Figure 1:
FIGS. 1, 2, and 3 include front, side, and rear perspective views of an optical signal detector configured for use for position measurement of an optical signal in accordance with various examples.
Figure 1:

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Systems and methods disclosed herein may be used in relation to position measurement of an optical signal (e.g., a laser beam) in two-dimensional (2D) space. The systems and methods include combinations of optical signal sensors and high-speed logarithmic amplifiers capable of providing high bandwidth, wide dynamic range, and high sensitivity.

As used herein, bandwidth refers to a temporal response of the optical signal sensor and indicates the speed at which the optical signal sensor can respond to fluctuations in the input optical signal. As used herein, a high bandwidth includes 1 megahertz (MHz) or greater.

As used herein, dynamic range refers to a range of optical power levels that the optical signal sensor can accurately detect and measure. Dynamic range is the difference between the minimum and maximum optical power levels that the optical signal sensor can handle while maintaining reliable and accurate measurements. An optical signal sensor with a wide dynamic range can handle a wide range of input optical power levels, from very weak to very strong signals, without saturation or loss of accuracy. As used herein, a wide dynamic range includes dynamic ranges of equal to or greater than 70 decibels (dB).

As used herein, sensitivity refers to the smallest change in optical power that an optical signal sensor can detect and measure accurately. It indicates the optical signal sensor's ability to detect weak optical signals or small variations in signal intensity. A highly sensitive optical signal sensor can detect even subtle changes in the input signal, making it suitable for applications where the optical signal is low in power. As used herein, high sensitivity includes sensitivities of negative 60 decibel-milliwatts (dBm) (e.g., 1 nanowatt) or lower.

In some examples, the system and methods are capable of efficiently operating in applications that include the presence of atmospheric turbulence such as, but not limited to, terrestrial free-space optical communications and light detection and ranging (LIDAR) applications. As used herein, atmospheric turbulence refers to random and rapid fluctuations in the optical properties of the Earth's atmosphere, primarily caused by variations in temperature, pressure, and wind velocity. These fluctuations lead to changes in the refractive index of the air, which, in turn, affects the path of light as it travels through the atmosphere. In the context of optical signal sensor, atmospheric turbulence poses a significant challenge because it can degrade the quality of optical signals passing through the atmosphere. The atmospheric turbulence causes light rays to take irregular paths, leading to spatial and temporal variations in the received signal's intensity, phase, and angle. This effect is known as atmospheric scintillation.

In some examples, the systems and methods are capable of efficiently operating on lightly filter power. As used herein, lightly filtered power refers to an electrical or electronic signal that has undergone a relatively minimal amount of filtering to remove noise or unwanted frequency components. Filtering is a process used to selectively attenuate certain frequencies in a signal while allowing others to pass through. In this context, lightly filtered power indicates that the signal has undergone a filtering process, but the filtering applied only addresses certain noticeable or problematic noise components, leaving the majority of the signal relatively unchanged.

Figure 2:
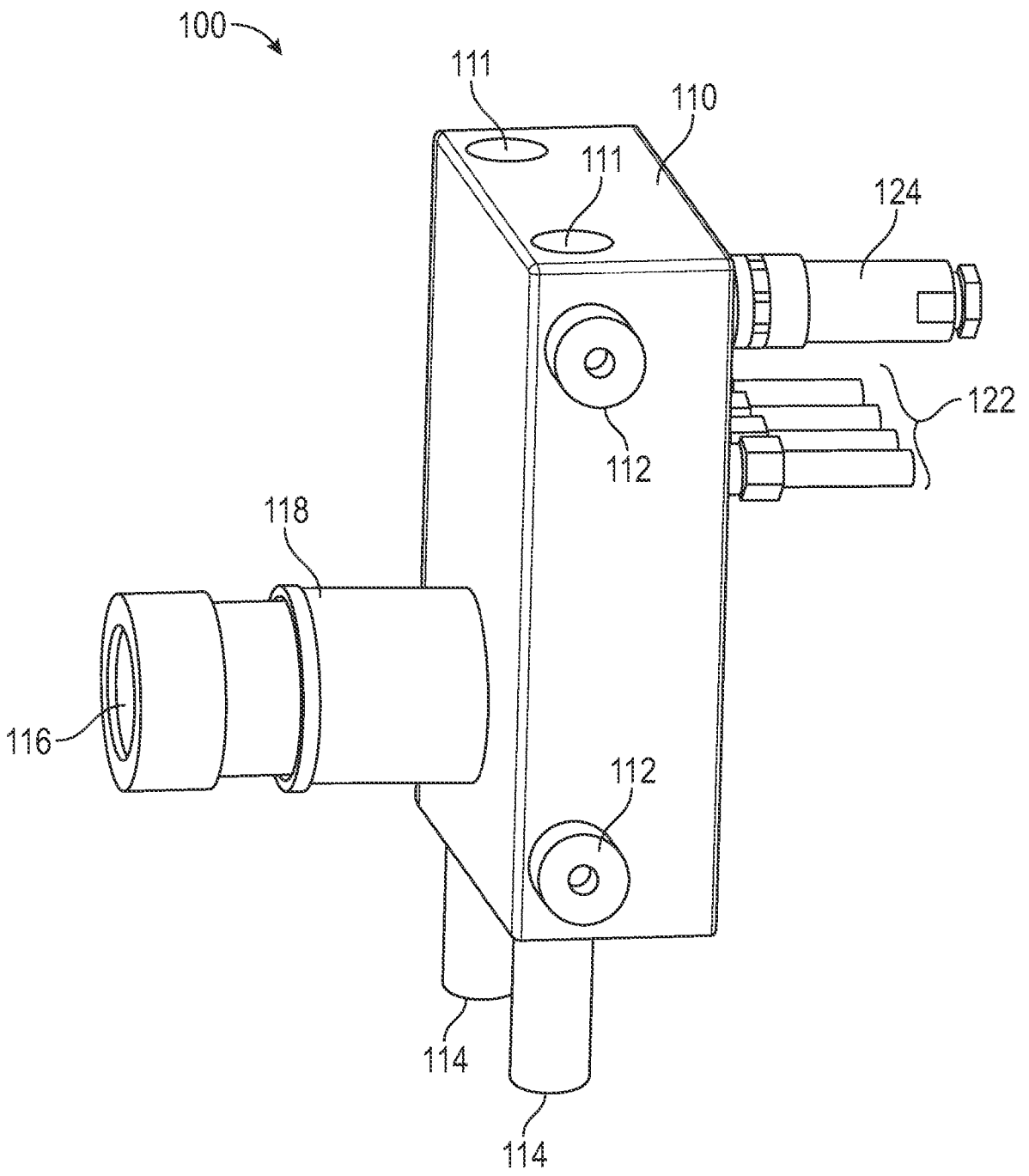
Figure 3:
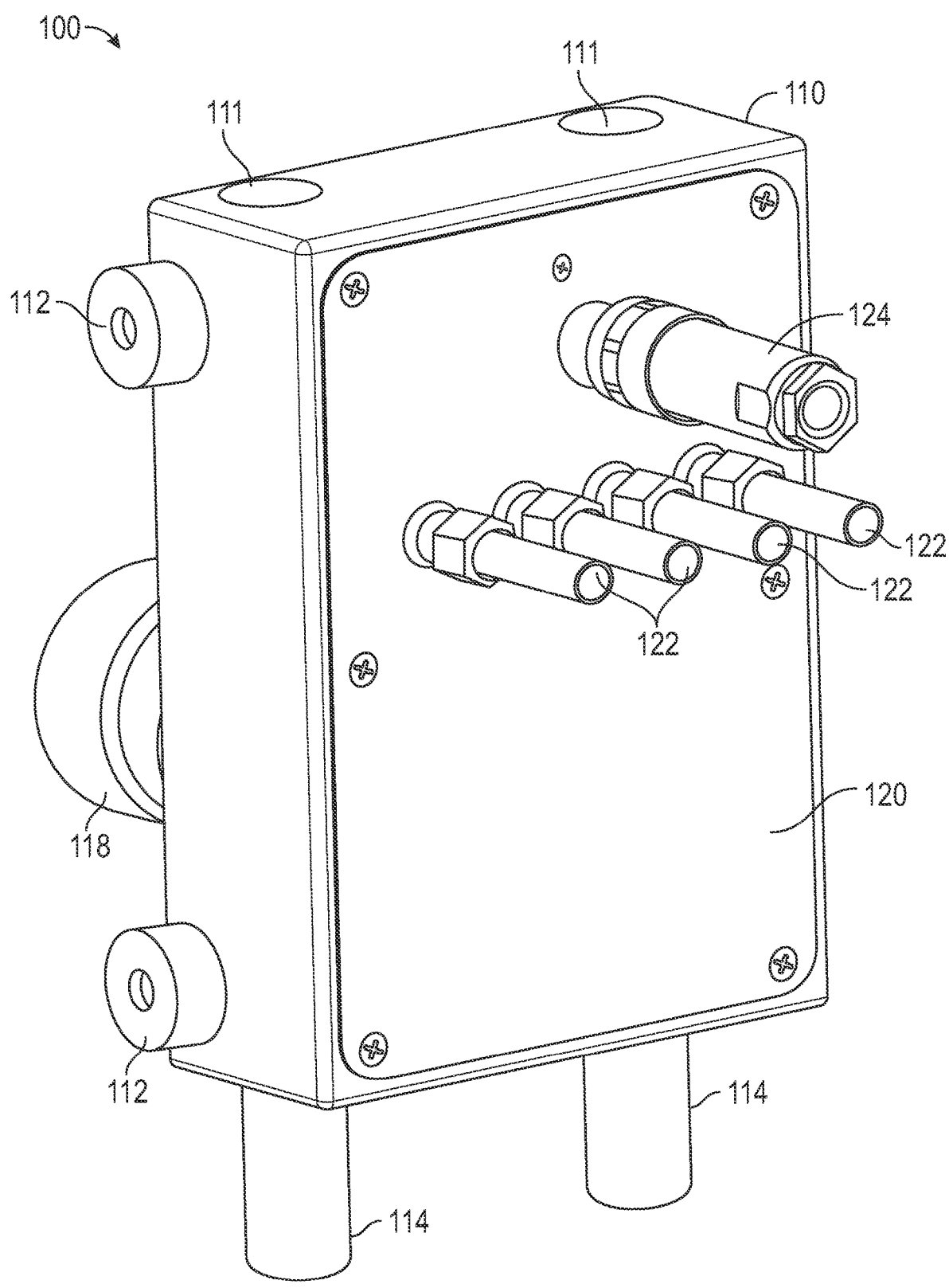

Referring initially to FIGS. 1-3, an exemplary optical signal detector 100 is provided that is configured for use for position measurement of an optical signal (e.g., a laser beam). The detector 100 includes a housing 110 configured to enclose and/or support other various components of the detector 100, an aperture in the housing 110 configured for receiving optical signals therethrough, various components configured to sense the optical signals and convert the optical signals to logarithmic analog signals, and various components configured to transmit the logarithmic analog signals to remote systems separate from and external to (e.g., geographically dispersed from) the detector 100 for processing, such as digitalization and digital signal processing. Since the detector 100 produces logarithmic analog signals, it is capable of providing a wide dynamic range.

In this example, the housing 110 has a rectangular exterior shape; however, the housing 110 is not limited to any particular size or shape. In some examples, the housing 110 may be configured to be installed as a component of another system, such as a pointing acquisition and tracking system. In such examples, the housing 110 may include various features configured for positioning and securing the housing 110 within the other system. In the example of FIGS. 1-3, the housing 110 includes slots or holes 111 extending through the housing 110 that are configured to slidably receive therein positioning pins 114. Each of the positioning pins 114 may be inserted into the holes 111 to a desired position and then secured with corresponding turn knob fasteners 112. The fasteners 112 are threadedly coupled to the housing 110 and configured to selectively apply a clamping force to a corresponding positioning pin 114. Exposed portions of the positioning pins 114 may be secured within the other system to position and secure the detector 100 therein.

Figure 4:
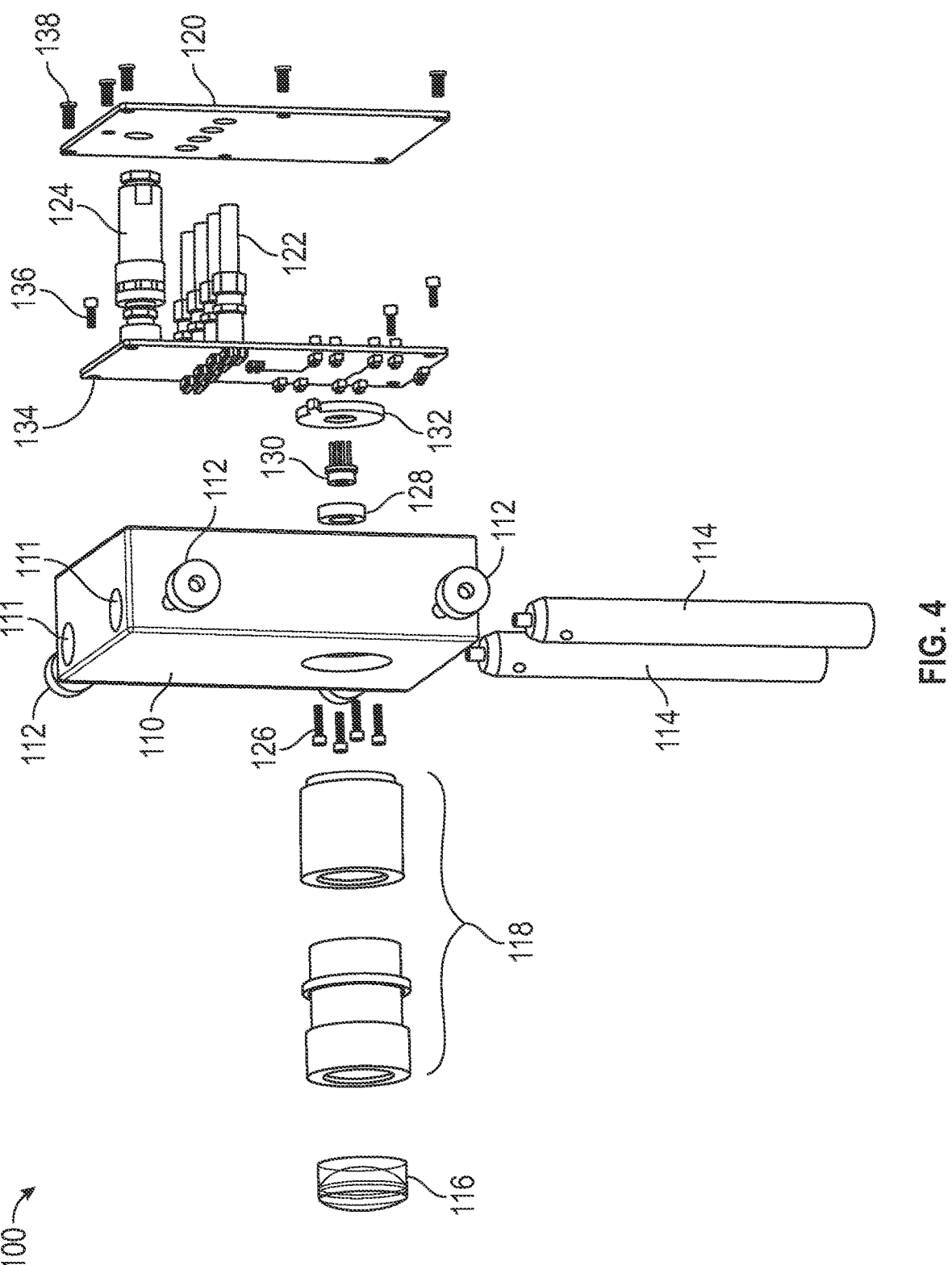
FIG. 4 is an exploded view of the optical signal detector of FIGS. 1-3 showing certain components thereof in accordance with various examples.

With reference to FIG. 4 and with continued reference to FIGS. 1-3, the detector 100 includes a lens and narrow band filter 116 configured to be secured to and operate in combination with an adjustable optical tube assembly 118. The adjustable optical tube assembly 118 may be secured to the aperture of the housing 110. In this example, the adjustable optical tube assembly 118 includes a pair of components rotatably secured to each other and configured to be rotated relative to each other to adjust a longitudinal length of the adjustable optical tube assembly 118. In this manner, a distance from the lens and narrow band filter 116 may be adjusted relative to fixed components within the housing 110.

Figure 6:
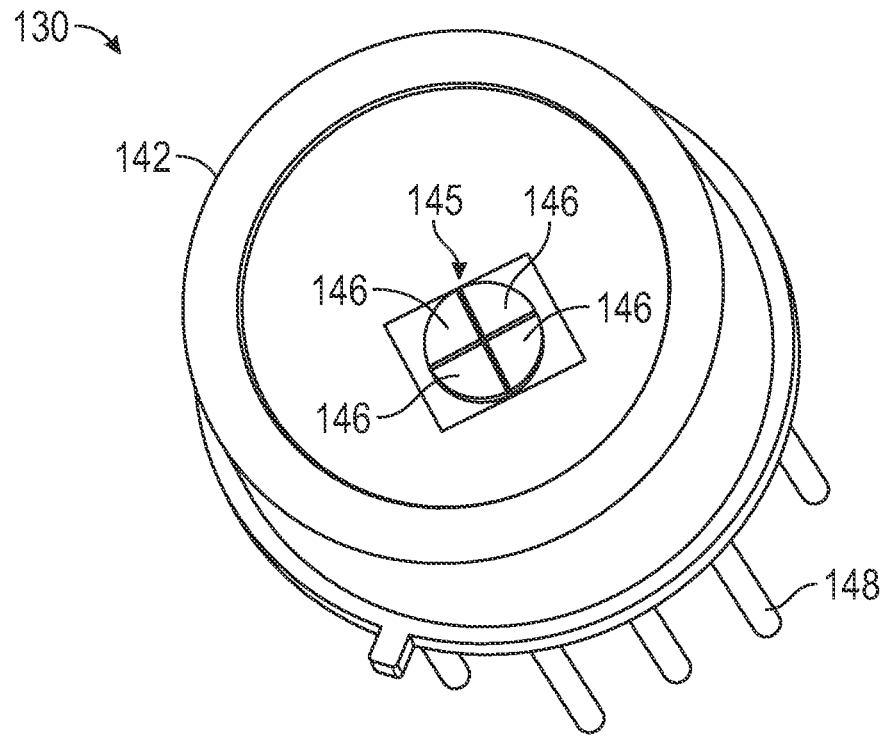
FIG. 6 includes front and side perspective views of an optical quadrant sensor in accordance with various examples.
Figure 6:
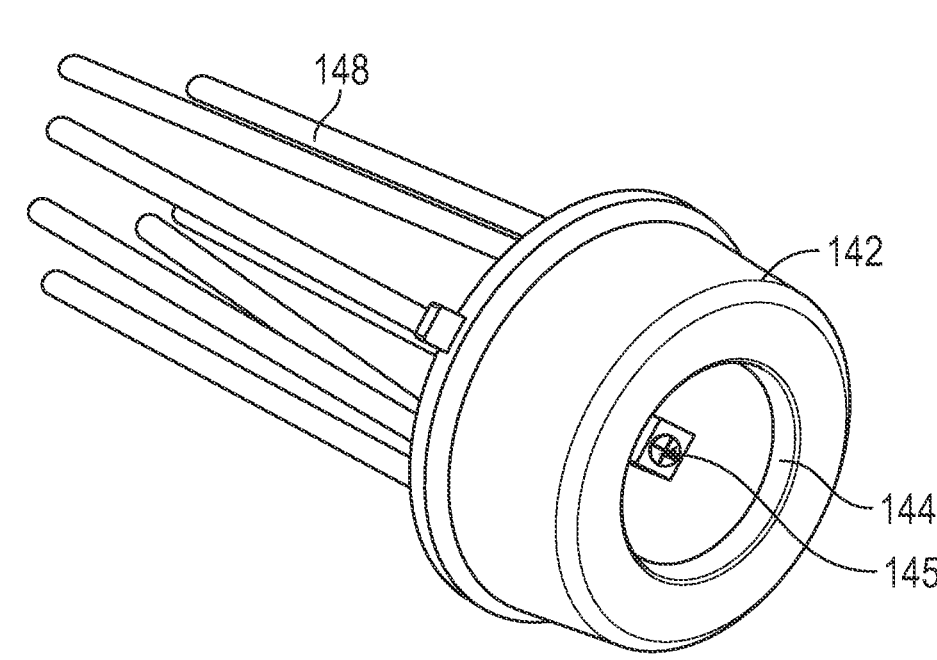

The detector 100 includes an optical signal sensor 130 configured to be contacted (i.e., irradiated) by the optical signal upon entering the aperture. That is, the input optical signal is directed to produce a light spot on a sensing surface 145 of the optical signal sensor 130. As best viewed in FIG. 6, the sensor 130 includes a body 142 having an aperture exposing the sensing surface with separate photodiodes 146 arranged about a common center of the sensor 130. In this example, four photodiodes 146 are arranged in a pie-like configuration; however, other configurations are possible such as a square or rectangular configuration and/or with various numbers of photodiodes 146. Each of the photodiodes 146 are configured to detect at least a portion of the optical signal impinging therewith and generate analog signals therefrom. The analog signals may be photo currents (Ix). The generated analog signals may be transmitted along conductive, elongated contacts 148. In this example, each of the photodiodes 146 are coupled to two of the contacts 148 representing positive and negative contacts for current flow.

The photodiodes 146 may have various sizes and, in some examples, the size of the photodiodes 146 may affect certain parameters of the sensor 130. For example, relatively larger (e.g., 3 millimeters) photodiodes 146 may promote increased sensitivity whereas relatively smaller (e.g., 1 millimeter) photodiodes 146 may promote reduced noise.

Figure 5:
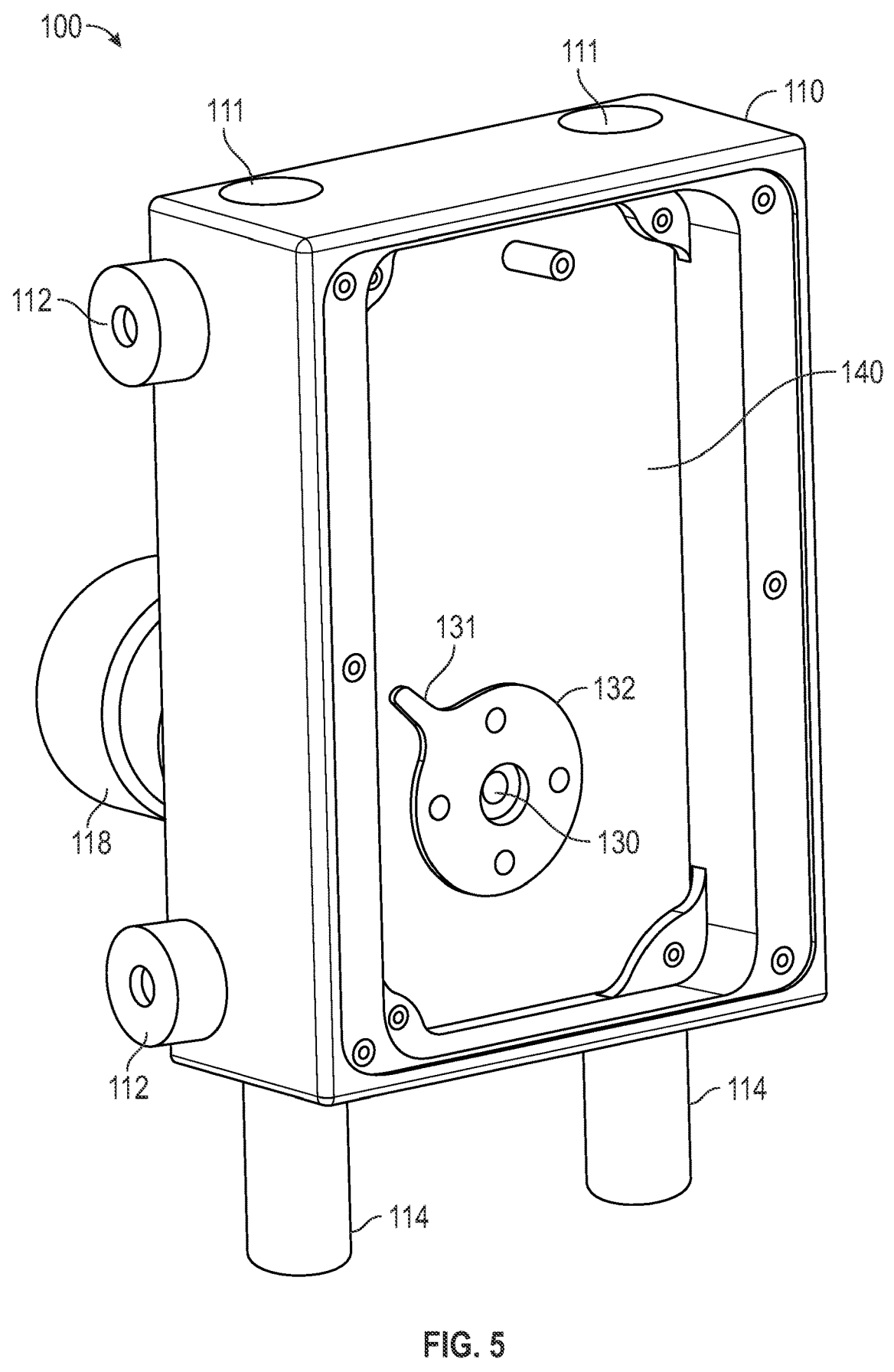

Various structures may be provided to fix a position of the sensor 130 within the housing 110. In the represented example, the sensor 130 is secured within the housing 110 with a nut bar or sensor retainer 132. In this example, the sensor retainer 132 includes a ring-shaped body having a central opening configured to allow passage therethrough of the contacts 148 without being sufficiently large to allow the body 142 of the sensor 130 to pass therethrough. In some examples, the sensor retainer 132 may be configured to fix the sensor 130 against a surface of the housing 110. In other examples, the sensor 130 may be received in a cavity formed between the sensor retainer 132 and a sensor adapter 128. In such examples, the sensor retainer 132 may be configured to fix the sensor adapter 128 against a surface of the housing 110. FIG. 5 presents a rear view of the housing 110 with a cover panel 120 removed to expose an internal compartment 140 of the housing 110. In FIG. 5, the sensor 130 is secured to the housing 110 with the sensor retainer 132 which in turn is secured with sensor retainer fasteners 126. Notably, the sensor retainer 132 includes a radially extending arm 131 configured to be received within a corresponding recess of the housing 110 and thereby provide a predetermined alignment of the sensor 130.

Figure 7:
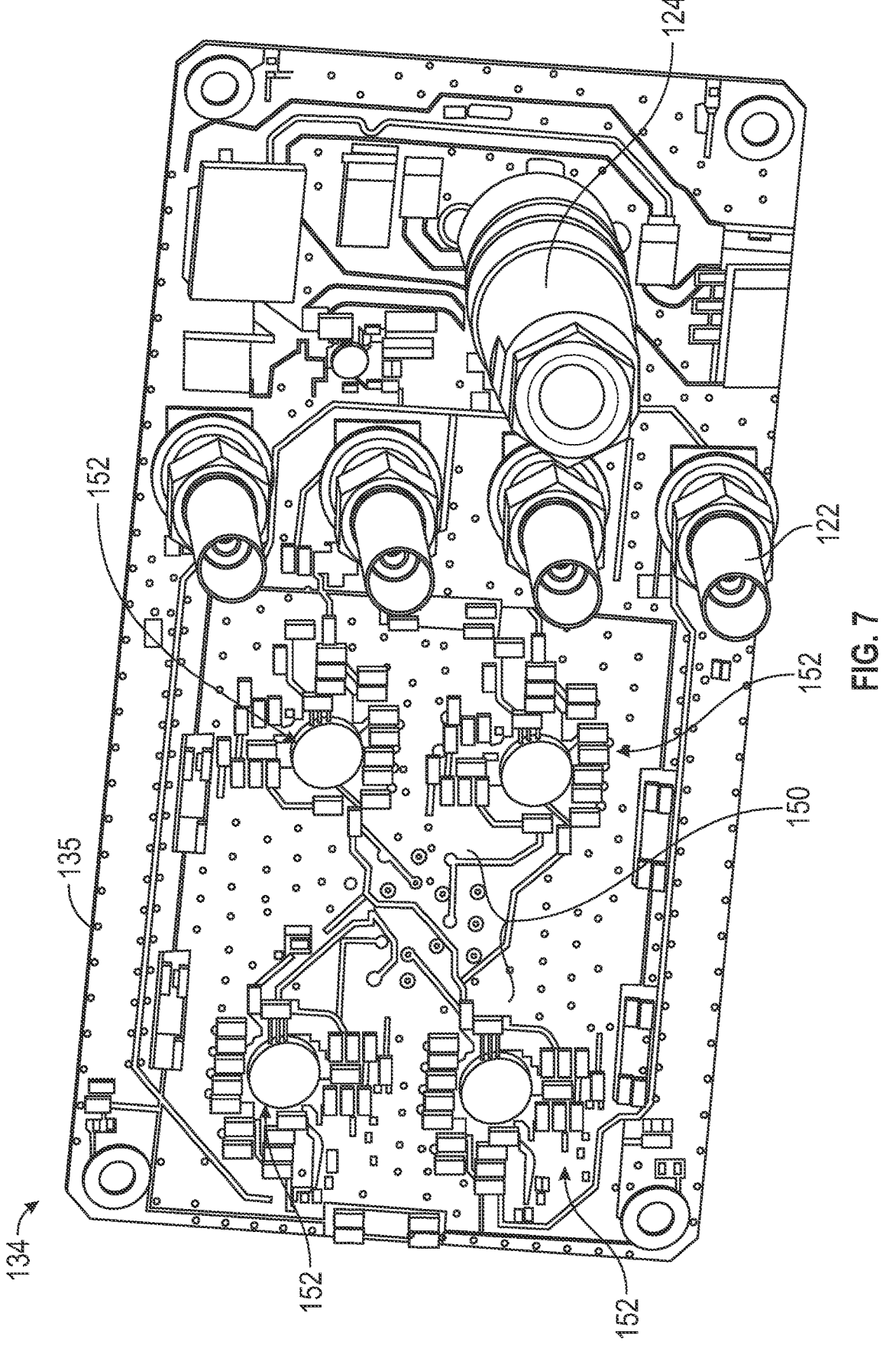
FIG. 7 includes a perspective view of a circuit card assembly configured for generating logarithmic analog signals from input analog signals in accordance with various examples.

A circuit card assembly (CCA) 134 may be retained within the compartment 140 of the housing 110. The CCA 134 include various circuitry and components configured to receive the analog signals from the sensor 130, generate therefrom the logarithmic analog signals, and transmit the logarithmic analog signals to the aforementioned remote system. The CCA 134 may have various components configured to provide these functions and is not limited to any particular arrangement. As best viewed in FIG. 7, in this example, the CCA 134 includes a circuit board 135 having various components fixed thereto or formed thereon that are functionally coupled by various circuitry. The CCA 134 includes plated holes 150 each configured to receive and electrically couple with a corresponding one of the contacts 148 of the sensor 130.

Logarithmic circuits or amplifiers 152 are each individually functionally coupled with corresponding pairs of the plated holes 150. Each pair of the plated holes 150 are coupled with a corresponding pair of the contacts 148 associated with one of the photodiodes 146. As such, each of the logarithmic amplifiers 152 are configured to receive the analog signals as input from a corresponding one of the photodiodes 146, produce or generate logarithmic analog signals that are proportional to the logarithm of the magnitude of the received analog signals, and output the logarithmic analog signals. In other words, the logarithmic amplifiers 152 compress a wide range of levels of the received analog signals into a more manageable output range, while maintaining the logarithmic relationship between the various levels of the received analog signals. The logarithmic amplifiers 152 may include various components such as transistors and diodes to achieve the logarithmic compression of the received analog signals. The logarithmic amplifiers 152 may be configured to have a wide dynamic range.

Filters are functionally coupled to with the logarithmic amplifiers 12 and configured to filter the logarithmic analog signals received therefrom. In various examples, the filters may be configured to enhance bandwidth or to reduce noise. The filters may be implemented using various passive components such as resistors, capacitors, and inductors.

Four signal cable connectors 122 are fixed to the circuit board 135 and configured to be releasably coupled with signal cables (not shown). The signal cable connectors 122 are each functionally coupled to a corresponding one of the logarithmic amplifiers 152 and configured to receive the logarithmic analog signals therefrom and transmit the logarithmic analog signals to the remote system. The signal cable connectors 122 may be configured for analog outputs of, for example, 0-5 volts (V).

A power cable connector 124 is fixed to the circuit board 135, configured to releasably couple with a power cable (not shown) coupled to a power source, and configured to provide electrical power to the other components of the CCA 134 from the power source via the power cable. The power cable connector 124 may be configured for DC power input of, for example, 12-15 volts (V).

The CCA 134 may be secured within the compartment 140 of the housing 110 with circuit board fasteners 136 (e.g., screws). The cover panel 120 may be secured to the housing 110 to enclose the compartment 140 with cover fasteners 138 (e.g., screws). The cover panel 120 includes holes configured to allow the signal cable connectors 122 and the power cable connector 124 to pass therethrough and be exposed at an exterior to the housing 110 when the detector 100 is assembled.

Figure 8:
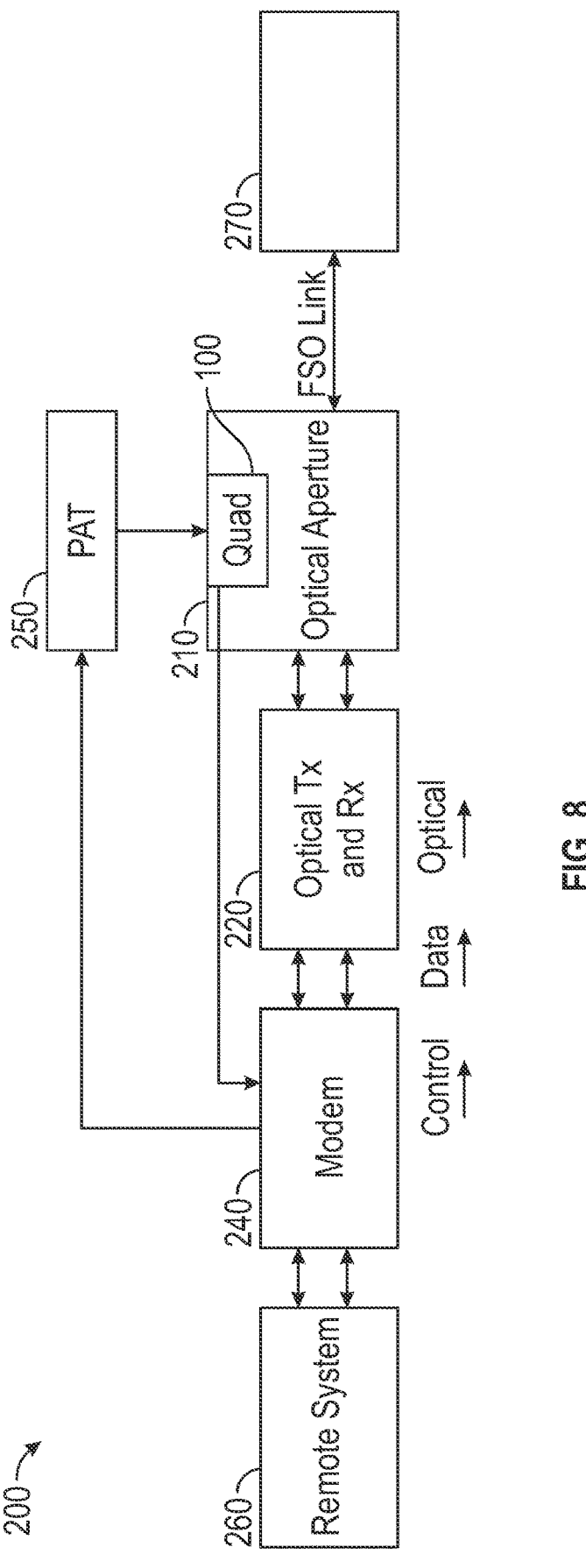
FIG. 8 is a functional block diagram of a free space optical (FSO) communication system in accordance with various examples.

The detector 100 may be used in various applications. FIG. 8 presents a nonlimiting example wherein the detector 100 is installed in an optical aperture 210 of a free space optical (FSO) communication system 200 for use in pointing, acquisition, and tracking (PAT) of optical signals (e.g., modulated laser beams). The FSO communication system 200 includes the optical aperture 210, a transceiver system 220, a modem system 240 and a pointing, acquisition, and tracking (PAT) system 250 functionally coupled to each other. These components may be separate, linked apparatuses or may be parts of one or more combined apparatuses.

The optical aperture 210 includes an aperture for receiving an optical signal, in this example, an FSO link. In various embodiments, the optical aperture 210 may include components such as, but not limited to, a telescope or other optical device for receiving the optical signal via the aperture, one or more fast moving mirrors for redirecting the received optical signal, the detector 100 for producing logarithmic analog signals from the optical signal, and a collimator for receiving the logarithmic analog signals from the detector 100 and providing a parallel optical signal therefrom.

The transceiver system 220 may include various components that, in combination, are configured to convert the optical signal to data and control signals, and transmit and receive data and control signals with the modem system 240.

The modem system 240 may include various components that, in combination, are configured for sending and receiving data and control signals between the transceiver system 220 and a remote system 260. The remote system 260 may provide for external processing of the data and control signals, such as digitalization and digital signal processing or further analog signal processing. In various examples, the remote system 260 may digitalize the data signals, and perform a signal sum function on the digitalized data signals to determine a position of the light spot of the optical signal on the sensor 130, and thereby determine an orientation of the optical signal and/or a position of a source of the optical signal.

The PAT system 250 may include various components that, in combination, are configured to receive control signals from the remote system 260 and adjust the orientation of the optical aperture 210, for example, to improve alignment with the optical signal.

Various signals received by, directed within, and transmitted from the FSO communication system 200 may be various types of signals and may be transmitted in various manners. In some examples, one or more of the various signals may be optical signals transmitted through free space. In some examples, one or more of the various signals may be optical signals transmitted though fiber optic cables. In some examples, one or more of the various signals may be electrical signals transmitted through conductive wires (e.g., communication bus, ethernet, etc.). In some examples, one or more of the various signals may be electromagnetic signals transmitted through a wireless network.

The FSO communication system 200 may be used for two-way communication via the FSO link with another FSO communication system 270. The FSO communication system 270 may be substantially the same as or different from the FSO communication system 200.

Although the device 100 and the FSO communication system 200 are described herein as using a remote system (e.g., the remote system 260) for external signal processing, in some examples these tasks may be perform by the device 100 and/or local components of the FSO communication system 200. For example, the device 100 may include one or more processors, memory devices, and/or other components configured to perform the signal processing locally.

Referring now to FIG. 9 and with continued reference to FIGS. 1-8, a method 300 is presented for position measurement of an optical signal in accordance with various examples. For convenience, the method 300 will be described in reference to the optical signal detector 100 as installed in the optical terminal 210 of the free space optical (FSO) communication system 200. However, the method 300 is not limited to the specific structure, components, and arrangement of the optical signal detector 100, the optical terminal 210, or the free space optical (FSO) communication system 200.

The method 300 may start at 310. At 312, the method 300 may include receiving, with the optical signal detector 100, an optical signal from an optical signal source (e.g., the FSO communication system 270). At 314, the method 300 may include directing the optical signal to impinge upon one or more of the photodiodes 146 of the optical signal sensor 130 of the optical signal detector 100. At 316, the method 300 may include sensing the optical signal with the one or more of the photodiodes 146 of the optical signal sensor 130. At 318, the method 300 may include generating, by each of the photodiodes 146, analog signals based on portions of the optical signal impinging thereon. At 320, the method 300 may include logarithmically amplifying the analog signals with the logarithmic amplifiers 152 to generate logarithmic analog signals. At 322, the method 300 may optionally include transmitting the logarithmic analog signals to the remote system 260. At 324, the method 300 may include converting, by one or more processors (either locally or in the remote system 260), the logarithmic analog signals to digital data. At 326, the method 300 may include determining, by the one or more processors (either locally or in the remote system 260), an orientation of the optical signal relative to the optical signal detector 100. The method 300 may end at 328.

In various examples, the method 300 may further include performing, by the one or more processors of the remote system 260, a sum function on the digital signals. In various examples, the method 300 may further include transmitting the orientation of the optical signal to the optical signal detector. In various examples, the method 300 may further include adjusting the optical signal detector to align the optical signal with a common center point of the photodiodes.

The detectors, systems, and methods described herein may provide various benefits over existing detectors, systems, and methods. For example, the detectors, systems, and methods include combinations of optical signal sensors and high-speed logarithmic amplifiers capable of providing high bandwidth, wide dynamic range, and high sensitivity. In addition, existing detectors, systems, and methods that use linear amplification require normalization to determine positions of the optical signal. In contrast, the detectors, systems, and methods disclosed herein are configured to determine positions of the optical signals without normalization.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical signal detector, comprising:
an aperture for receiving an optical signal;
an optical signal sensor having separate photodiodes each configured to be irradiated with portions of the optical signal directed from the aperture, detect the portions of the optical signal impinging therewith, and generate analog signals therefrom, wherein the optical signal sensor is configured to have: (i) a wide dynamic range of at least 70 decibels (dB) or greater, (ii) a high bandwidth of at least 1 megahertz (MHz) or greater, and (iii) a high sensitivity of at most negative 60 decibel-milliwatts (dBm) or less; and
logarithmic amplifiers each configured to receive the analog signals from a corresponding one of the photodiodes of the optical signal sensor, perform logarithmic amplification of the received analog signals, and generate logarithmic analog signals from the analog signals.

2. The optical signal detector of claim 1, further comprising a communication device configured to receive the logarithmic analog signals from the logarithmic amplifiers and transmit the logarithmic analog signals to a remote system external and separate from the optical signal detector.

3. The optical signal detector of claim 1, wherein the aperture includes a lens configured to receive the optical signal therethrough and an optical tube assembly having a pair of components coupled to each other and configured to be rotated relative to each other to modify a dimension between the lens and the optical signal sensor.

4. The optical signal detector of claim 1, wherein the optical signal sensor has a size between 1 and 3 millimeters, wherein each logarithmic amplifier is individually functionally coupled with a corresponding pair of contacts associated with one of the photodiodes.

5. The optical signal detector of claim 1, wherein the photodiodes of the optical signal sensor are arranged in a pie-like configuration around a common center point of the optical signal sensor.

6. A system, comprising:

an optical signal detector comprising:

an aperture for receiving an optical signal;

an optical signal sensor having separate photodiodes each configured to be irradiated with portions of the optical signal directed from the aperture, detect the portions of the optical signal impinging therewith, and generate analog signals therefrom, wherein the optical signal sensor is configured to have: (i) a wide dynamic range of at least 70 decibels (dB) or greater, (ii) a high bandwidth of at least 1 megahertz (MHz) or greater, and (iii) a high sensitivity of at most negative 60 decibel-milliwatts (dBm) or less;

logarithmic amplifiers each configured to receive the analog signals from a corresponding one of the photodiodes of the optical signal sensor, perform logarithmic amplification of the received analog signals, and generate logarithmic analog signals from the analog signals; and a controller configured to, by one or more processors:

convert the logarithmic analog signals to digital data; and determine an orientation of the optical signal relative to the optical signal detector including determining a position of a light spot of the optical signal on the optical signal sensor.

7. The system of claim 6, wherein the optical signal detector is a component of a first system, the controller is a component of a second system that is separate and remote from the first system, wherein the first system includes a first communication device configured to receive the logarithmic analog signals from the logarithmic amplifiers and transmit the logarithmic analog signals to the second system, wherein the second system includes a second communication device configured to receive the logarithmic analog signals or other signals derived therefrom.

8. The system of claim 7, wherein the second communication device of the second system is configured to transmit the orientation of the optical signal or data derived therefrom to the first system.

9. The system of claim 6, wherein the aperture includes a lens configured to receive the optical signal therethrough and an optical tube assembly having a pair of components coupled to each other and configured to be rotated relative to each other to modify a dimension between the lens and the optical signal sensor.

10. The system of claim 6, wherein the optical signal sensor has a size between 1 and 3 millimeters, wherein each logarithmic amplifier is individually functionally coupled with a corresponding pair of contacts associated with one of the photodiodes.

11. The system of claim 6, wherein the photodiodes of the optical signal sensor are arranged in a pie-like configuration around a common center point of the optical signal sensor.

12. The system of claim 6, wherein the controller is configured to, by the one or more processors, perform a sum function on the digital data.

13. The system of claim 6, further comprising a positioning apparatus configured to adjustably align the optical signal with a common center point of the photodiodes of the optical signal sensor based on the orientation of the optical signal as determined by the controller.

14. A method, comprising:

receiving, with an optical signal detector, an optical signal from an optical signal source;

directing the optical signal to impinge upon photodiodes of an optical signal sensor of the optical signal detector, wherein the optical signal sensor is configured to have: (i) a wide dynamic range of at least 70 decibels (dB) or greater, a high bandwidth of at least 1 megahertz (MHz) or greater, a high sensitivity of not more that negative 60 decibel-milliwatts (dBm) or less;

sensing the optical signal with the photodiodes of the optical signal sensor;

generating, by each of the photodiodes, analog signals based on portions of the optical signal impinging thereon;

logarithmically amplifying the analog signals with logarithmic amplifiers to generate logarithmic analog signals;

converting, by one or more processors, the logarithmic analog signals to digital data; and determining, by the one or more processors, an orientation of the optical signal relative to the optical signal detector without a normalization step.

15. The method of claim 14, wherein the one or more processors are components of a remote system external to and separate from the optical signal detector, wherein the method includes transmitting the logarithmic analog signals to the remote system.

16. The method of claim 15, further comprising transmitting the orientation of the optical signal or data derived therefrom from the remote system to a first system comprising the optical signal detector.

17. The method of claim 14, further comprising performing, by the one or more processors, a sum function on the digital data.

18. The method of claim 14, further comprising adjusting the optical signal detector to align the optical signal with a common center point of the photodiodes based on the orientation of the optical signal as determined by the one or more processors.

19. The method of claim 18, where adjusting the optical signal detector includes locating a center of a light spot of the optical signal on the optical signal sensor on a center point of the optical signal sensor.

20. The method of claim 14, further comprising adjusting an optical tube assembly of the optical signal detector by rotating a pair of coupled components thereof relative to each other to modify a dimension between a lens thereof receiving the optical signal and the optical signal sensor.

* * * * *